United States Patent [19]

Dill

[11] 4,381,731

[45] May 3, 1983

[54] HYDRAULIC POWER SYSTEM FOR A PLURALITY OF OPERATING UNITS IN A POULTRY OF LIVESTOCK CONFINEMENT HOUSE

[75] Inventor: Terry A. Dill, Keota, Iowa

[73] Assignee: Jefferson Industries Company, Fairfield, Iowa

[21] Appl. No.: 290,715

[22] Filed: Aug. 6, 1981

[51] Int. Cl.[3] .................... A01K 1/00; A01K 31/00; F15B 11/16

[52] U.S. Cl. .................................... 119/21; 119/22; 60/394; 60/424; 60/911

[58] Field of Search .................... 119/21, 22, 16, 18; 60/DIG. 2, 394, 424, 468, 484

[56] References Cited

U.S. PATENT DOCUMENTS

| | | | |
|---|---|---|---|
| 3,641,764 | 2/1972 | Destefan et al. | 60/484 |
| 3,768,442 | 10/1973 | Van Huis | 119/22 |
| 3,768,444 | 10/1973 | Van Huis | 119/22 |
| 3,981,149 | 9/1976 | Rice | 60/424 |
| 4,103,489 | 8/1978 | Fletcher et al. | 60/DIG. 2 |

*Primary Examiner*—Hugh R. Chamblee

*Attorney, Agent, or Firm*—Rudolph L. Lowell

[57] ABSTRACT

The hydraulic power system includes a single electrical motor for driving a fluid pump which supplies fluid under pressure to a plurality of series connected fluid motors, with the first motor in the series directly to the pump outlet and the last motor in the series to a fluid reservoir that constitutes the fluid source for the pump. The electrical motor is operable in response to a call for the actuation of any one of said fluid motors, and requires a maximum power output relative to the pump fluid capacity so that the fluid pressure and flow characteristics delivered by the pump satisfy the full load operating requirements of the last fluid motor in the series of motors when all of the other fluid motors are under full load operation.

6 Claims, 3 Drawing Figures

HYDRAULIC POWER SYSTEM FOR A PLURALITY OF OPERATING UNITS IN A POULTRY OF LIVESTOCK CONFINEMENT HOUSE

BACKGROUND OF THE INVENTION

Confinement houses for livestock or poultry generally include a feeding system with a feed transfer unit, a manure removing system with a conveyor unit, and a ventilating system with exhaust and fresh air fan or louver units. Each of these units usually has a separate associated electrical drive motor and control therefor to provide for their independent operation in response to a predetermined demand requirement. The number of units to be operated varies with the size of the confinement house some of which require twenty or more electrical drive motors. The initial installation of the electrical equipment is expensive due to the multiple electric motors, some of which embody speed reduction mechanisms. Additionally, the operating cost of the motors is not only expensive, but the circuitry involved is subject to electrical shorts and sparking so as to create hazards of fire and injury. Also, due to the tendency of an electric motor to immediately pick up a load, the service life of a conveying or transfer unit driven thereby is appreciably reduced because of shock starts.

The objections and disadvantages of these electrical drive systems are substantially eliminated by the present invention.

SUMMARY OF THE INVENTION

The hydraulic power system of this invention is economical in initial cost and efficient and inexpensive in operation to jointly or independently operate a plurality of series connected fluid motors from a single fluid pump having an electrical drive motor. Each fluid motor is provided with a bypass line having a normally open electrical fluid shut-off valve operable in response to an associated control unit connected in the electrical circuit of the electric motor to initiate operation of the electric motor concurrently with a closing of the shut-off valve. The electric motor and fluid pump have relative maximum output specifications limited to the requirements for a concurrent full load operation of all of the series connected fluid motors. A single low power electric motor and pump assembly is thus utilized to operate one or all of the fluid motors. Fluid is supplied to the fluid motors under progressively increasing pressures to a predetermined operating pressure so that power is smoothly and gradually applied to the units driven thereby to eliminate any sudden or shock starts. To assure a smooth start of the individual fluid motors, a pressure accumulator unit is provided upstream from the first motor in the series connected motors.

DESCRIPTION OF THE INVENTION

Figures 1, 2:
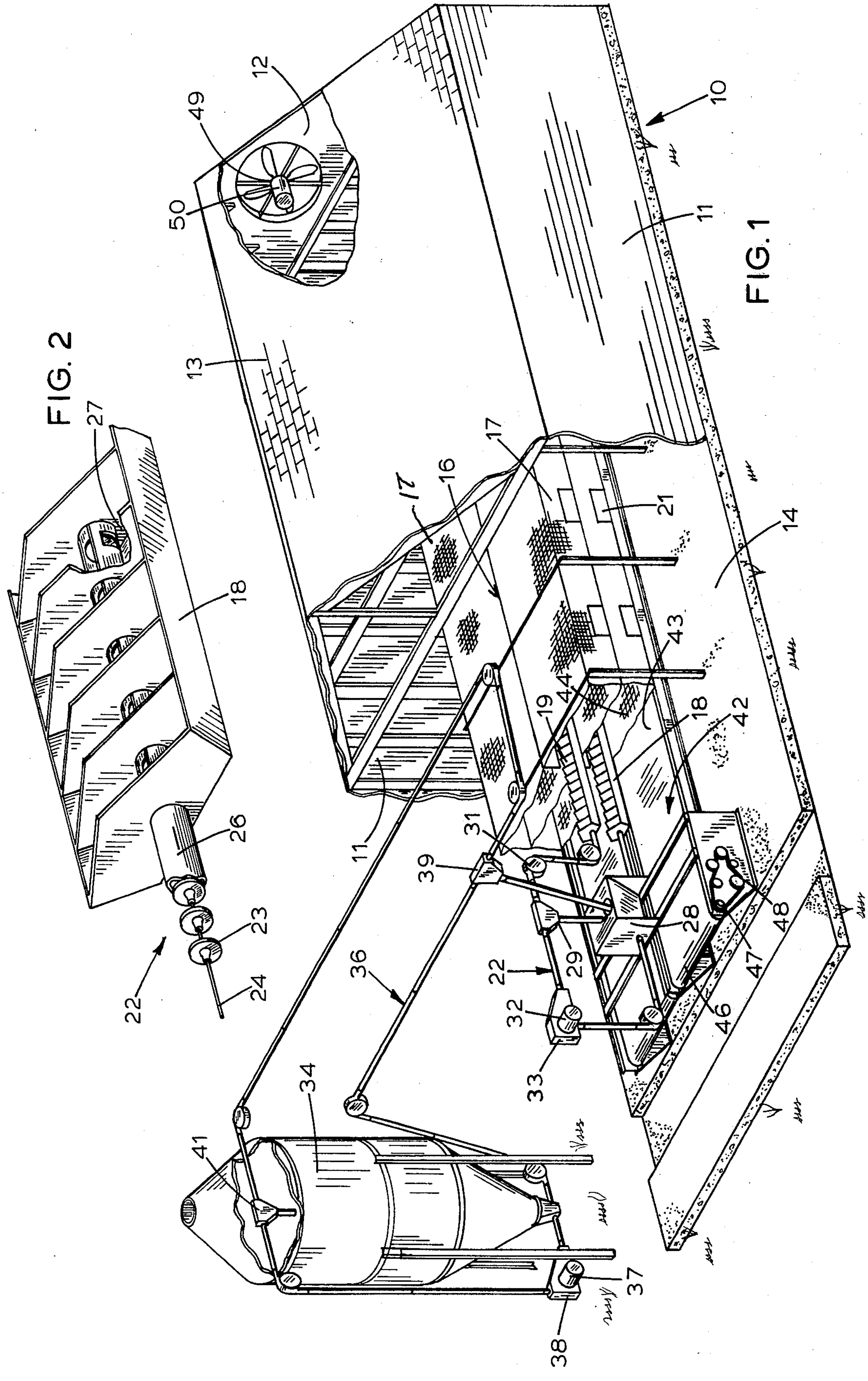
FIG. 1 is a diagrammatic perspective view of a cage type poultry confinement house, with parts broken away for the purpose of more clearly showing the arrangement of the operating units therein.
FIG. 2 is a detail perspective view of a feeding trough and bead type feed conveyor therefor.

With reference to FIG. 1 of the drawings, the hydraulic power transmission system of this invention may be used in a poultry cage or confinement house 10 having usual side walls 11, end walls 12, a roof 13 and a concrete floor 14. Extended longitudinally of the house 10 is a row of double decked poultry cages 16 arranged in a side by side relation with each deck including a pair of cage sections 17 arranged to opposite sides of conveyor feed portions 18 and 19. The conveyor feed portions 18 and 19 are coextensive in length with the row of cages 16. As illustrated, the conveyor portion 18 is located between the cage sections 17 of the lower deck. Each poultry cage 16 has an access door 21 at each end thereof.

The conveyor feed portions 18 and 19 form part of the continuous conveyor 22 of bead type. Thus, referring to FIG. 2, it is seen that the conveyor 22 includes a series of disc members 23 strung in an axially spaced relation on a cable 24 for travel through an associated tubular casing 26. The upper half of the casing 26 is removed over the conveyor feed portions 18 and 19 for inspection purposes of conveyor operation. A trough 27 receives feed from a conveyor feed portion 18 and 19 to assure the delivery of fresh feed to every cage 16 at substantially the same time. In this respect, it is to be noted that poultry cannot reach the feed through the open top of the conveyor casing 26.

The conveyor 22 (FIG. 1), as previously mentioned, is continuous and during a feed transfer operation delivers feed from a hopper or feed box 28 into the feed portion 18 for travel transversely of the cage sections 17 in the lower deck of the poultry cages 16. At the end of its travel through the conveyor feed portion 18, the conveyor 22 is reversed to form the conveyor feed portion 19 which supplies feed to the cage sections 17 of the upper deck of the poultry cages 16.

On traveling outwardly from the upper deck of the cages 16, the conveyor 22 is directed for travel across the top of the feed hopper 28 and through a downspout 29 to discharge or return any residual feed therein into the feed hopper. From the downspout 29 the conveyor 22 re-enters the bottom of the hopper to complete its feed transfer cycle. In its continuous travel in the above described manner the flexibility of the conveyor 22 permits its travel in right angle turns about enclosed idler sprocket units indicated as 31.

The conveyor 22 is driven by a hydraulic motor unit 32 which is operatively associated with a drive sprocket (not shown) that forms part of an enclosed drive sprocket unit 33.

The feed hopper 28 may be supplied with feed from a feed bin 34 located exteriorly of the poultry house 10 by a second continuous bead type conveyor 36 that is driven by a hydraulic motor 37 operatively associated with a drive sprocket unit 38 suitably supported adjacent the lower end of the feed bin 34. From the drive sprocket unit 38 the conveyor 36 travels through the lower end of the feed bin 34 to a downspout 39 arranged above the hopper 28 for delivering feed thereto. From the downspout 39 the conveyor 36 is directed into the upper end of the feed bin 34 and through a downspout 41 for the return to the bin of any residual feed therein. On being emptied, the conveyor 36 continues its travel about the drive sprocket unit 38 for re-entry into the lower end of the feed bin 34. In the even the feed hopper 28 should become filled during the operation of the conveyor 36, all of the feed in the conveyor 36 will be returned to the feed bin 34 at the downspout 41.

For the removal of droppings or chicken manure from the poultry cages 16, there is provided a bottom flat type manure conveyor 42 that is mounted for the travel of its upper length 43 immediately below the cage sections 17 of the lower deck of cages 16. Each cage section 17 has a meshed floor 44 so that poultry droppings are received directly onto the conveyor 42 for discharge from the conveyor end 46 directly into a loading vehicle (not shown) for disposal. A drive roller 47 at the conveyor ends 46 is in a driven relation with a hydraulic motor 48.

A livestock or poultry confinement house 10 generally has ventilation equipment which may include louver units, fans or the like for admitting atmospheric air into the confinement house or for exhausting air from the house into the atmosphere. For this purpose, there is illustrated in FIG. 1, a fan unit 49 carried in an end wall 12 adjacent the roof 13. Although only a single fan unit is shown, it is to be understood that a fan unit 49 would be installed at each end of the confinement house 10 which may be of appreciable length. It is contemplated to have a fan 49 for admitting atmospheric air into the house 10 and a fan for discharging air into the atmosphere. Each fan unit has an associated hydraulic motor.

The feed conveyors 22 and 36, manure conveyor 42 and fan units 49 are usually operated from associated electric motors each of which is separately controlled either manually or automatically. In large confinement houses the number of motors and power requirements not only involves an initial high installation cost but also high operating costs and potential damage and injury resulting from sparks or shorts in the motors and electrical circuits therefor. This plurality of electric motors is eliminated by the hydraulic power system of this invention.

Figure 3:
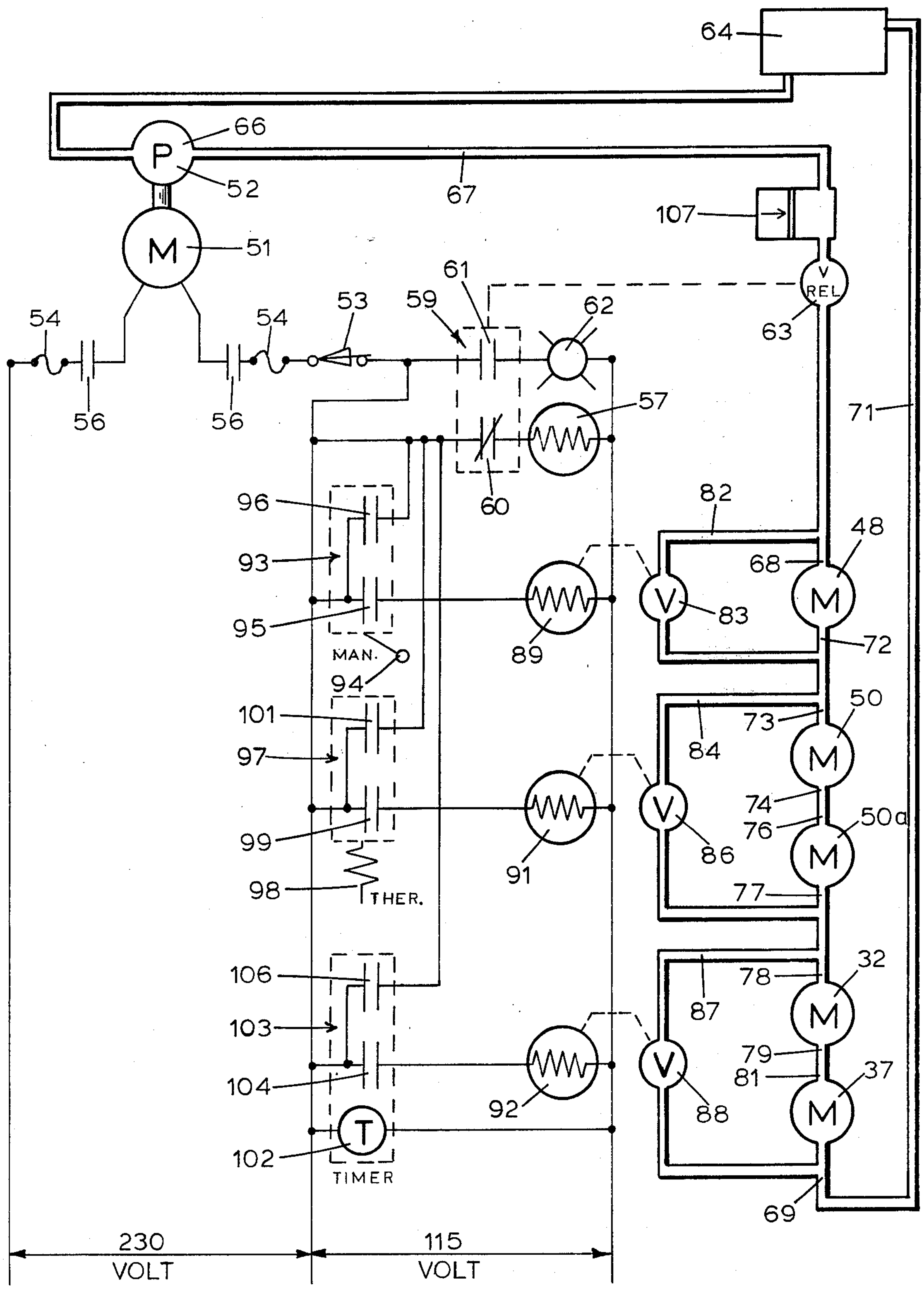
FIG. 3 illustrates diagrammatically the interconnection of the hydraulic and electrical circuits in the hydraulic power system of this invention.

Referring to FIG. 3, this system is shown as utilizing only a single electric motor 51 and hydraulic pump 52 for operating the hydraulic motors 32, 37 and 48 for the conveyors 22, 36 and 42, respectively, and motors 50 and 50*a* for the ventilating fans. The maximum power requirement of the electric motor and pump assembly 51, 52 need only be sufficient to operate all the motors 32, 37, 48, 50 and 50*a* simultaneously so that the pressure and flow characteristics in the hydraulic circuit will maintain their operation in response to full load demands thereon.

The electrical circuit for the electric motor 51 includes a 230 volt A.C. power supply, a manually actuated master switch 53, fuses 54 and motor relays or contacts 56 which are energized to closed positions on energization of a coil 57. The coil 57 is in a series connection with a normally closed switch 60 which forms part of a relay 59 that also includes a normally open switch 61 electrically associated with a signal light 62 and an electrical pressure switch 63. The coil 57, signal light 62 and pressure switch 63 are in a 115 volt A.C. supply circuit that also includes the controls for actuating the hydraulic motors 32, 37, 48, 50 and 50*a*.

These hydraulic motors are connected in series with each other and with the pump 52 and pump reservoir 64. In this respect, the pump outlet 66 is connected by a fluid line 67 to the inlet 68 of the manure conveyor motor 48 which is shown as being the first of the hydraulic motors in the series connection thereof with the last motor 37 in the series connection having its outlet 69 connected by a fluid line 71 with the pump reservoir 64. The outlet 72 of the hydraulic motor 48 is connected directly to the inlet 73 of the fan motor 50, the outlet 74 of which is connected directly to the inlet 76 of the fan hydraulic motor 50*a*. In turn, the outlet 77 of the hydraulic motor 50*a* is connected to the inlet 78 of the hydraulic motor 32 for the conveyor 22, the outlet 79 of which is connected directly to the inlet 81 of the conveyor motor 37, the outlet 69 of which is connected to the pump reservoir 64.

A fluid bypass line 82 provided with a shut off valve 83 connects the inlet 68 and outlet 72 of the motor 48. A bypass line 84 connects the inlet 73 of the hydraulic motor 50 with the outlet 77 of the hydraulic motor 50*a* and carries a shut off valve 86. In like manner, a bypass line 87 connects the inlet 78 of the motor 32 with the outlet 69 of the motor 37 and has a shut off valve 88. The valves 83, 86 and 88 have associated energizing coils 89 91 and 92, respectively.

The motor 48 for the manure conveyor 42 is actuated through a relay 93 having normally open switches 95 and 96 and a switch lever 94. On closing of the relay 93, by the manual switch lever 94, the coil 89 is energized through switch 95 to close the shut off valve 83. Simultaneously the coil 57 is energized through switch 96 to provide for the closing of the motor relays 56 to initiate operation of the electric motor 51. Fluid under pressure from the pump 52 is thus supplied to the motor 48 and through the bypass lines 84 and 87 for return through the line 71 to the pump reservoir 64.

Assume that only the ventilating fans are to be operated. The hydraulic motors 50 and 50*a* are operated in response to the actuation of a relay 96 by a room thermostat 98. The relay 97 includes two normally open switches 99 and 101. On a demand of the thermostat 98, closing of the relay switch 99 energizes coil 91 to close the normally open shut off valve 86 and closing of the relay switch 101 provides for energization of the coil 57 to initiate operation of the motor 51 in all respects the same as explained in connection with the operation of the conveyor motor 48. Fluid under pressure from the pump 52 is then supplied to the motors 50 and 50*a* through line 67 and bypass line 82, and through the motors 50 and 50*a*, bypass line 87 and line 71 to the fluid reservoir 64.

The motors 32 and 37 are shown as being simultaneously operated in response to a time clock actuated relay 103 that includes a timer 102 and normally open switches 104 and 106. On call by the timer 102, relay switch 104 is closed to energize coil 92 associated with the shut off valve 88. Assuming that only the motors 32 and 37 are to be operated, closing of the relay switch 106 energizes the coil 57 to initiate actuation of the motor 51. Oil under pressure is thus supplied to the motors 32 and 37 through line 67, and bypass lines 82 and 84 for return to the reservoir 64 through line 71.

The above described operation of the hydraulic power system has assumed independent actuation of the manure conveyor 42, feed conveyors 22 and 36, and ventilating fans 49. However, it will be apparent that should the motor 48 of the manure conveyor be in operation when a call is made by the thermostat 98 for operation of the fan units that closing of the switch 101 of the relay 97 would be without any effect on the coil 57 which was previously energized by the closing of the switch 96 in the relay 93. Stated otherwise, the coil 57 remains energized so long as a switch 96, 101 or 106 is closed. As a result, the motor 51 is operated to drive the pump 52 in response to the independent closing of the switches 96, 101 and 106 to independently take care of demand calls by the realys 93, 97 and 103 and in response to a closing of all of the switches 96, 101 and 106 to concurrently operate all of the hydraulic motors.

It is to be further noted that any number of hydraulic motors may be incorporated in the power system of FIG. 3 to opeate additional equipment in a poultry cage house such as heating units, egg receiving conveyors and the like. Also, if the confinement house includes a plurality of rows of cages 16, the feed conveyors 22 and 36 may be operated together as illustrated, or independently of each other by merely providing each motor 32 and 37 with an associated bypass line and shut off valve, wherein each shut off valve would be actuated by its own timer and relay. In a like manner, separate actuation of the fan motors 50 and 50*a* can be provided, with each fan unit being associated with a separate thermostatically actuated relay.

The pressure switch 63, connected in the fluid line 67, functions to close the switch 61 of the relay 59 concurrently with opening the normally closed switch 60 to de-energize the coil 57 and in turn the motor relays 56 to shut off the motor 51. Also connected in the line 67 is an accumulator 107 of a commercially available type which functions to provide for a slow build up of fluid pressure from the pump 52 for supply to the hydraulic motors. By virtue of this progressive pressure build up in the hydraulic system, wear and tear on the conveyors and fan units is appreciably reduced since sudden shock starts are substantially eliminated.

Although the invention has been described with respect to a preferred embodiment thereof, it is to be understood that it is not to be so limited since changes and modifications can be made therein which are within the full intended scope of this invention as defined by the appended claims.

I claim:

1. A hydraulic power system for operating a plurality of fluid motors, separately or jointly and each of which has an inlet and an outlet, said power system comprising:

(a) a single hydraulic pump having an inlet and an outlet, (b) an electrical motor for driving said pump, (c) a source of fluid for said pump connected to the inlet thereof, (d) means connecting said motors in series with each other and with said pump, with the inlet of the first one of the motors in said series connected to the pump outlet, and the outlet of the last one of the motors in the series connected to said fluid source, (e) a fluid by-pass line extended between and connected to the inlet and outlet of each motor, (f) an electrically operated normally open shut-off valve in each fluid by-pass line, and (g) an electrical circuit for said electric motor including an actuator means associated with each shut-off valve and with said electrical motor to energize said circuit to concurrently operate said electrical motor and close a shut-off valve.

2. The invention according to claim 1 wherein:

(a) said electrical motor has a maximum power output relative to the fluid capacity of the pump to provide for a joint full load operation of all of said fluid motors.

3. The invention according to claim 1, including:

(a) a fluid accumulator unit connected in said series connection upstream of the inlet of said first one of the fluid motors in the series to provide for a progressive increase in the fluid pressure delivered by the fluid pump to a fluid motor during the initial operation of the electrical motor.

4. A hydraulic power system for independently or jointly operating a feeding system, a manure removing system and a ventilating system in a livestock or poultry confinement house wherein the feeding system includes a feed transfer unit, the ventilating system air ventilating units, and the manure removing system a conveyor unit, said power system, including:

(a) a fluid pump and an electrical drive motor therefor, said pump having an inlet in fluid connection with a fluid reservoir, (b) a fluid motor for operating each said transfer unit, ventilating unit and conveying unit, with each hydraulic motor having a fluid inlet and a fluid outlet, (c) means fluid connecting said fluid motors in series with the inlet of the first one of the fluid motor in said series connected to the outlet of said fluid pump, and the outlet of the last one of the fluid motor in said series connected to said fluid reservoir, (d) a fluid by-pass line for each fluid motor extended between and fluid connected to the inlet and outlet of an associated fluid motor, (e) an electrically operated normally open fluid shut-off valve in each by-pass line, (f) an electrical circuit for each shut-off valve, (g) a manually actuated electrical switch in the circuit for the shut-off valve in the by-pass line of the fluid motor in said manure removing system, (h) an electrical timer in the circuit for the shut-off valve in the by-pass line of the fluid motor of said feeding system, (i) an electrical room thermostat in the circuit for the shut-off valve in the by-pass line of the fluid motor for said ventilating unit, (j) an electrical circuit for said electrical drive motor, and (k) electrical means interconnecting each of said shut-off valve electrical circuits with the circuit for said drive motor, for operating said electrical motor in response to the actuation of said manual switch, room thermostat and/or timer.

5. The power system according to claim 4, wherein:

(a) said electrical motor has a maximum power output relative to the fluid capacity of the pump such that the relative flow and pressure characteristics of the fluid flow from the pump will satisfy the full load operating requirements of all of said fluid motors, when all of said fluid motors are concurrently operated.

6. The power system according to claim 4, including:

(a) a fluid accumulator unit connected between the inlet of the first one of said fluid motors and the outlet of the fluid pump to provide for a progressive increase in the fluid pressure supplied to a fluid motor when said electrical motor is initially operated.

* * * * *